(12) United States Patent
Inoue et al.

(10) Patent No.: US 6,320,831 B1
(45) Date of Patent: Nov. 20, 2001

(54) METHOD OF PROCESSING SIGNALS FOR OPTICAL DISC DEVICE AND OPTICAL DISC DEVICE UTILIZING TWO SPLIT PHOTO DETECTORS

(75) Inventors: Takashi Inoue, Osaka; Keiichi Kameda, Uji; Tatsuya Suzuki; Hideaki Hatanaka, both of Katano; Masaaki Takata, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/341,463
(22) PCT Filed: Nov. 12, 1998
(86) PCT No.: PCT/JP98/05100
  § 371 Date: Jul. 12, 1999
  § 102(e) Date: Jul. 12, 1999
(87) PCT Pub. No.: WO99/26239
  PCT Pub. Date: May 27, 1999

(30) Foreign Application Priority Data

Nov. 14, 1997 (JP) .................................................. 9-312530

(51) Int. Cl.[7] ...................................................... G11B 7/00
(52) U.S. Cl. .................................. 369/47.22; 369/53.22; 369/53.23; 369/124.07
(58) Field of Search ............................. 369/47.22, 53.22, 369/53.23, 53.31, 59.25, 124.07

(56) References Cited

U.S. PATENT DOCUMENTS 5,208,792 * 5/1993 Imanaka .
5,303,216   4/1994 Shinoda et al. .
5,383,169   1/1995 Shinoda et al. .
5,696,742 * 12/1997 Ogata et al. .

FOREIGN PATENT DOCUMENTS 6-42290    6/1994 (JP) .
7-296389   11/1995 (JP) .
9-259441   10/1997 (JP) .
10-162369   6/1998 (JP) .
10-302286  11/1998 (JP) .

* cited by examiner

Primary Examiner—W. R. Young
(74) Attorney, Agent, or Firm—Parkhurst & Wendel, L.L.P.

(57) ABSTRACT

An object of this invention is to provide a method for processing signals for an optical disc device and an optical disc device for immediately determining the on-track state of a main beam light impinging on an optical disc including land areas on which information is recorded, said optical disc being track-formatted to have a double spiral structure. In recording or reproducing information on or from the land areas while track-controlling a first reflected light (MB) based on a second reflect light (SB1) and a third reflect light (SB2), the phases of a sum signal (SUM) and a difference signal (DIFF) between a first push-pull signal (PP1) obtained from an output from a first split photo conductor (21) and a second push-pull signal (PP2) obtained from an output from a second split photo conductor (23) are compared to determine from the mutual phase relationship which land area is providing the first reflected light (MB).

4 Claims, 5 Drawing Sheets

METHOD OF PROCESSING SIGNALS FOR OPTICAL DISC DEVICE AND OPTICAL DISC DEVICE UTILIZING TWO SPLIT PHOTO DETECTORS

TECHNICAL FIELD

The present invention relates to a method of processing signals for an optical disc device and the optical disc device.

BACKGROUND ART

On a recordable optical disc such as a minidisc or a CD-R that is rotated at a constant linear velocity (CLV), address information indicating absolute positions on the optical disc and rotation control information for the optical disc are recorded beforehand by using wobbling guide grooves. The address information is encoded using recording codes (for example, biphase codes) that enable easy clock synchronization during reproduction, and signals obtained by FM-modulating these recording codes are recorded on the optical disc in such a way as to wobble through the guide grooves.

Such an optical disc is reproduced by obtaining from the optical disc FM-modulated signals formed by means of wobbling through the guide grooves, and then FM-demodulating the signals to extract biphase-encoded address information. Furthermore, a PLL (Phase Locked Loop) circuit is used to extract synchronizing clocks, which are then biphase-decoded to detect addresses. The rotation control information for the optical disc is synchronizing clocks extracted from the biphase signals and controls a spindle motor to rotate the optical disc so that the frequency and phase of the synchronizing clocks have predetermined values.

In such a system, efforts are being made to reduce the track pitch in order to accommodate the increased density of information recorded on an optical disc, but simply reducing the track pitch may cause crosstalk from adjacent wobbling grooves. An optical disc 5 of a track format such as that shown in FIG. 4 is used to avoid interference by crosstalk. The optical disc 5 has two types of land areas 3, 4 formed in a double spiral structure. The land areas 3 and 4 are two discontinuous areas. The land area 3 is sandwiched between a non-wobbling groove 2, which is shown to the left of the land area 3, and a wobbling groove 1, which is shown to the right of the land area 3, and information is recorded on this area 3. The land area 4 is sandwiched between the wobbling groove 1 shown to the left of the land area 4 and the non-wobbling groove 2 shown to the right of the land area 4, and as in the land area 3, information is recorded on this area 4. The wobbling groove 1 is wobbled to provide predetermined signals including address information and rotation control information (hereafter referred to as "wobble information"), while the non-wobbling groove 2 is not wobbled. The interval T between the wobbling grooves 1 is twice the track pitch Tp between the wobbling groove 1 and the non-wobbling groove 2 so that the structure is unlikely to be affected by crosstalk.

In the optical disc 5 of such a track format, the method called "differential push-pull" is used to control the tracking of a beam light impinging on one of the land areas 3 and 4. In this differential push-pull, the land area 3 is irradiated with a main beam M, and the wobbling groove 1 and the non-wobbling groove 2 are irradiated with subbeams SB1, SB2, respectively. Reflected lights of the subbeams are received by split photo detectors 21, 23, as shown in FIG. 5. Detection outputs from the split photo detectors 21, 23 are inputted to differential amplifiers 24, 25, respectively, to obtain difference signals (push-pull signals PP1, PP2). The push-pull signals PP1, PP2 are demodulated so that wobble information is obtained using one of the push-pull signals PP1, PP2 that detects a reflected light from the wobbling groove 1. Thus, the wobble information can be detected from either the subbeam SB1 or SB2. For example, Japanese Patent No. 1917370 describes tracking control in which, of three difference signals obtained by means of irradiation with the main beam MB and the two subbeams SB1, SB2, any two difference signals are calculated to determine their difference in order to obtain a tracking error signal.

Due to their double spiral structure shown in FIG. 4, the two land areas 3, 4 on which information is recorded are arranged to sandwich the wobbling groove 1. Since wobble information is recorded in the wobbling groove 1, address (absolute position) information on the two land areas 3, 4 is obtained from the shared wobbling groove 1 sandwiched by the two land areas 3, 4. Thus, wobble information is obtained from the wobbling groove 1 whether the main beam MB is impinging on the land area 3 or 4.

Specifically, if the main beam MB is impinging on the land area 3, wobble information is obtained by detecting a wobble signal from a reflected light of the subbeam SB2, whereas if the main beam MB is impinging on the land area 4 as shown by the dotted line, wobble information is obtained by detecting a wobble signal from a reflected light of the subbeam SB1. Thus, by determining which of the subbeams SB1, SB2 provides wobble information, it can be determined which of the two land areas 3, 4 is irradiated with the main beam MB.

This method, however, requires the two push-pull signals PP1, PP2 obtained from reflected lights of the two subbeams SB1, SB2 to be constantly demodulated by respective demodulating means. That is, two FM demodulating circuits 29 and two biphase demodulators 30 must be provided and constantly operated. Furthermore, FM demodulation and biphase decoding involve processing delay time, so it cannot be determined whether the main beam MB is impinging on the land area 3 or 4, immediately after the beam has focused on the land area.

An object of this invention is to provide a method of processing signals for an optical disc device and an optical disc device that can immediately determine the on-track state of the main beam light using a simple configuration.

DISCLOSURE OF THE INVENTION

An optical disc device signal processing method according to this invention can compare the phases of a sum signal and a difference signal obtained by calculating a push-pull signal obtained from an output from a split photo detector for detecting a reflected light of a subbeam SB1 and a second push-pull signal obtained from an output from a second split photo detector for detecting a reflected light of a subbeam SB2, in order to determine from the mutual phase relationship which land area is reflecting a main beam light, thereby immediately determine the on-track state of the main beam light using a simple configuration.

In a method of processing signals for an optical device according to the invention, in a track format optical disc has two land areas of a double spiral structure on which information is recorded, said land areas being arranged adjacent to each other sandwiching therebetween a wobbling groove on which wobble information is recorded by wobbling, and has non-wobbling grooves arranged outside the land areas, the method comprising the steps of: detecting a first reflected light obtained by irradiating the land area; using a first split photo detector disposed at a first prescribed position to detect a second reflected light obtained by irradiating the wobbling groove or the non-wobbling groove located adjacent to one side of the land area providing the reflected light; using a second split photo detector disposed at a second prescribed position to detect a third reflected light obtained by irradiating the wobbling groove or the non-wobbling groove located adjacent to the other side of the land area providing the reflected light; and recording or reproducing information on or from the land area while executing tracking control based on the first, second, or third reflected light or on a combination of these lights, wherein phases of a sum signal and a difference signal are compared between a first push-pull signal obtained from an output from the first split photo detector and a second push-pull signal obtained from an output from the second split photo detector, in order to determine from the phase relationship obtained between said two signals which land area is providing the first reflected light. This method can immediately determine the on-track state of the main beam light without causing a processing delay.

In a optical disc device according to the invention, in which a track format optical disc has two land areas of a double spiral structure on which information is recorded, said land areas being arranged adjacent to each other sandwiching therebetween a wobbling groove on which wobble information is recorded by wobbling, and has non-wobbling grooves arranged outside said land areas, said optical disc device executing: detecting a first reflected light obtained by irradiating the land area; using a first split photo detector disposed at a first prescribed position to detect a second reflected light obtained by irradiating the wobbling groove or the non-wobbling groove located adjacent to one side of the land area providing the reflected light; using a second split photo detector disposed at a second prescribed position to detect a third reflected light obtained by irradiating the wobbling groove or the non-wobbling groove located adjacent to the other side of the land area providing the reflected light; and recording or reproducing information on or from the land area while executing tracking control based on the first, second, or third reflected light or a combination of these lights. The optical disc device comprises: a signal processing means for detecting a sum signal and a difference signal between a first push-pull signal obtained from an output from the first split photo detector and a second push-pull signal obtained from an output from the second split photo detector; and a phase comparator for comparing phases of the sum signal and the difference signal to determine a mutual phase relationship, in order to use a determination output from the phase comparator as land area determination information. Thus, an optical disc device can be obtained in order for immediately determining the on-track state of the main beam light using a simple configuration.

In addition, the optical disc device may demodulate an output signal from the signal processing means to obtain address information, whereby the address information can be obtained using one set of demodulating means.

Furthermore, the optical disc device may have a signal selector that selects between the first and second push-pull signals based on the land area determination information output from the phase comparator, whereby the push-pull signal selected by the signal selector is demodulated to obtain address information.

EMBODIMENTS

Embodiment 1

Figure 2:
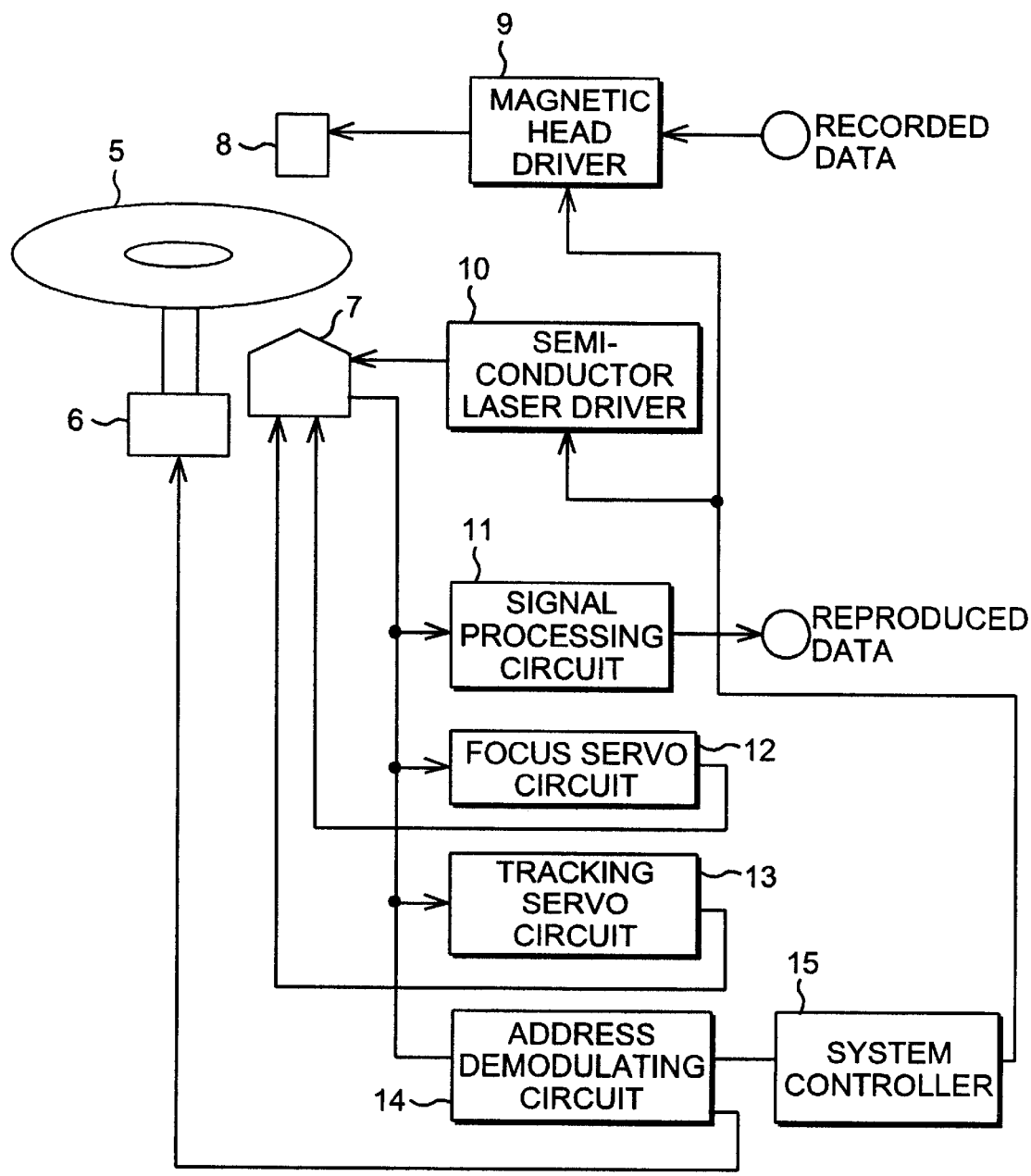
FIG. 2 is a block diagram showing a configuration of an optical disc device according to Embodiment 1.

An optical disc device that implements an optical disc device signal processing method according to this invention is composed of an optical disc 5, an optical pickup 7, an address demodulating circuit 14, and a system controller 15, as shown in FIG. 2.

A spindle motor 6 rotates the optical disc 5 at a predetermined speed, and the optical pickup 7 irradiates the optical disc 5 with a beam light to detect a reflected light in order to convert it into an electric signal. A magnetic head driver 9 drives the magnetic head 8 at a predetermined magnetic intensity, and the magnetic head 8 applies to the optical disc 5 magnetic fields modulated using recorded data.

A semiconductor laser driver 10 allows a semiconductor laser (not shown) disposed in the optical pickup 7 to emit light at a predetermined intensity.

Signals detected by the optical pickup 7 are supplied to a reproduced signal processing circuit 11, a focus servo circuit 12, a tracking servo circuit 13, and an address demodulating circuit 14.

The reproduced signal processing circuit 11 is supplied with a reproduced signal corresponding to recorded information recorded on the optical disc 5. The reproduced signal processing circuit 11 processes, for example, binarizes the reproduced signal and outputs reproduced data as digital data.

The focus servo circuit 12 obtains focus error information from the signal supplied by the optical pickup 7 and controls the optical pickup 7 according to the focus error information in order to control a beam light to focus on the optical disc 5.

The tracking servo circuit 13 obtains a tracking error signal from the signal supplied by the optical pickup 7 and controls the optical pickup 7 according to the tracking error signal in order to control beam light tracking so that a beam light focuses on a predetermined track.

The address demodulating circuit 14 obtains a wobbling signal from the signal supplied by the optical pickup 7 and demodulates the wobbling signal to obtain address information indicating which part of the optical disc 5 is irradiated with the main beam light while obtaining rotation control information required for the spindle motor 6 to rotate the optical disc 5 at a specified line speed.

The system controller 15 controls the optical disc device to be in a recording state or a reproduction state.

Figure 3:
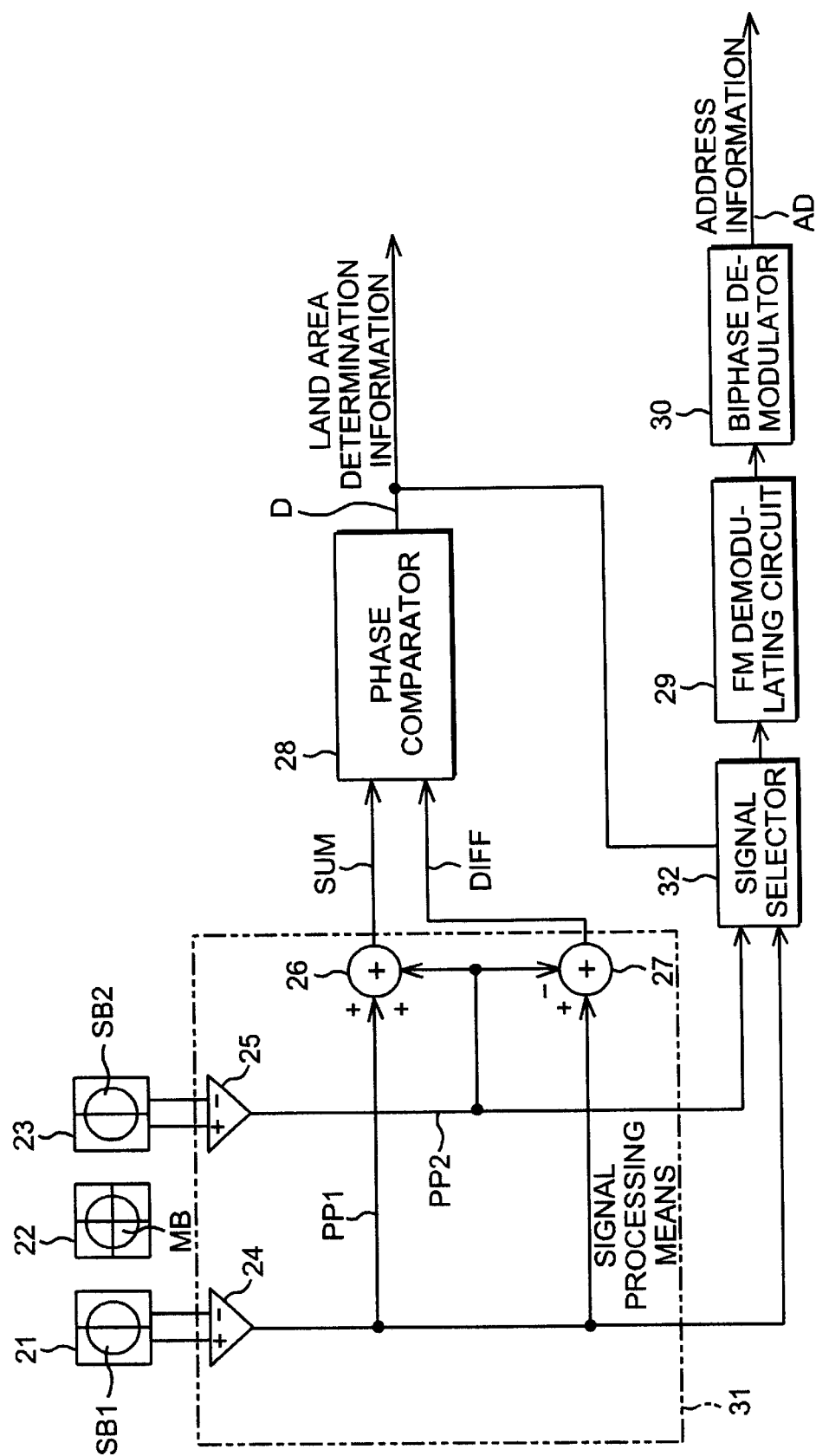
FIG. 3 is a block diagram of an address demodulating circuit according to Embodiment 2 of this invention.

The address demodulating circuit 14 is configured by split photo detectors 21, 23, a quadrant photo detector 22, a signal processing means 31, a phase comparator 28, and a demodulating means, as shown in FIG. 3. The demodulating means is configured by an FM demodulator 29 and a biphase demodulator 30.

Figure 4:
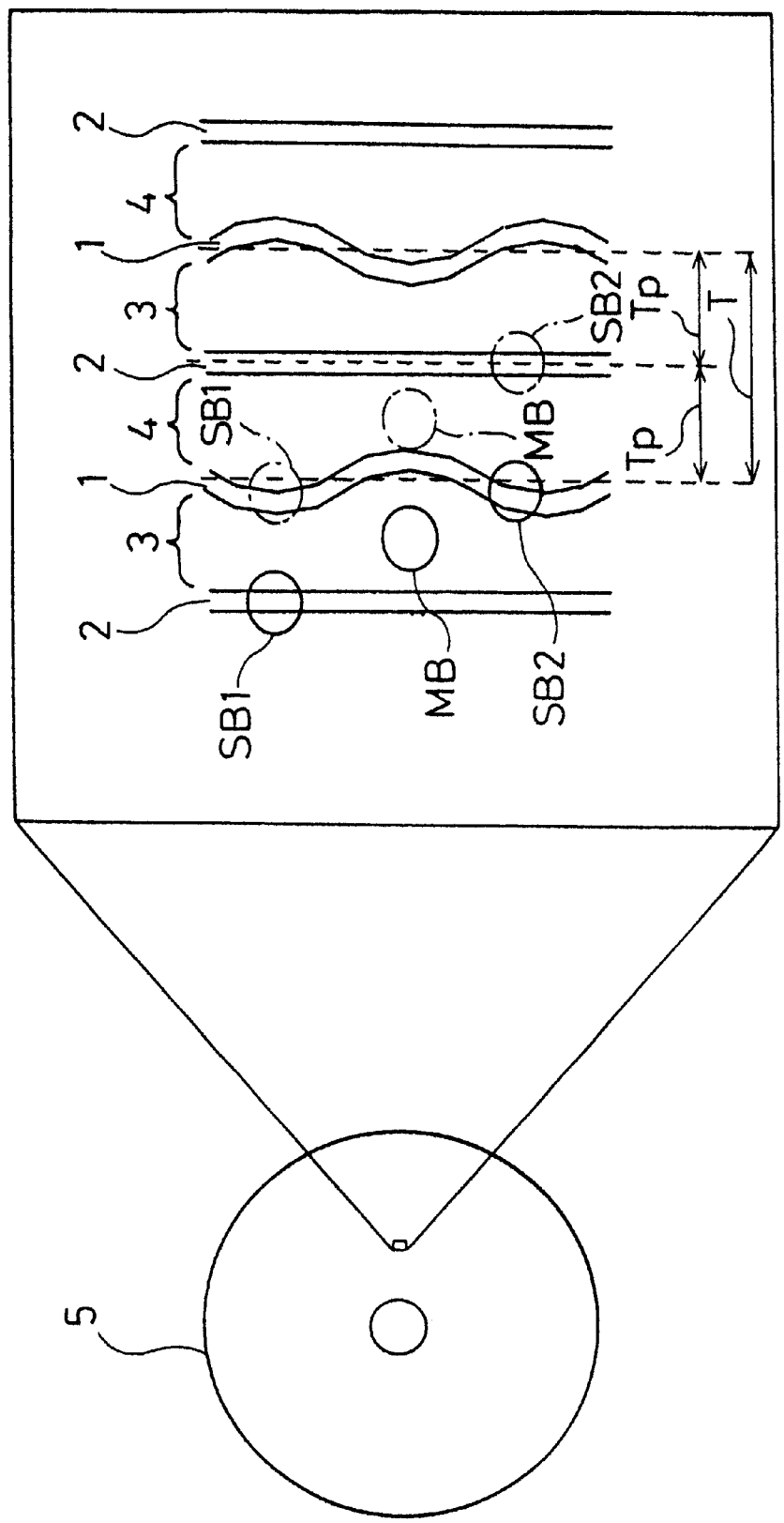
FIG. 4 is a schematic drawing outlining a track format of the optical disc.
Figure 5:
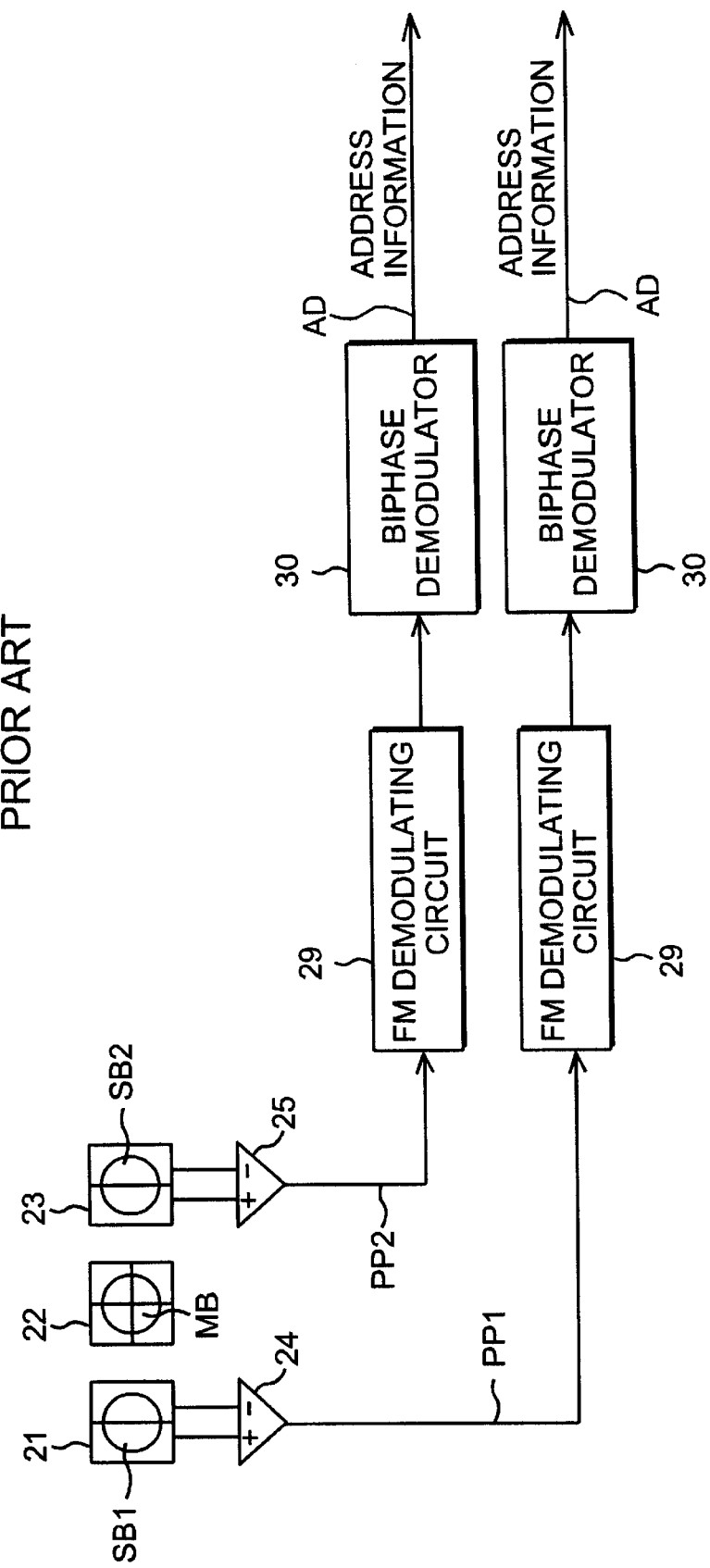
FIG. 5 is a block diagram of an address demodulating circuit of a conventional optical disc device.

Reflected lights of subbeams SB1, SB2 impinging on a wobbling groove 1 and a non-wobbling groove 2, which are shown in FIG. 4, are incident on the split photo detector 21 acting as a first split photo detector and the two photo detector 23 acting as a second split photo detector, respectively, which photo detectors are both disposed at prescribed positions within the optical pickup 7 shown in FIG. 2. The reflected lights are then converted into electric signals.

Figure 1:
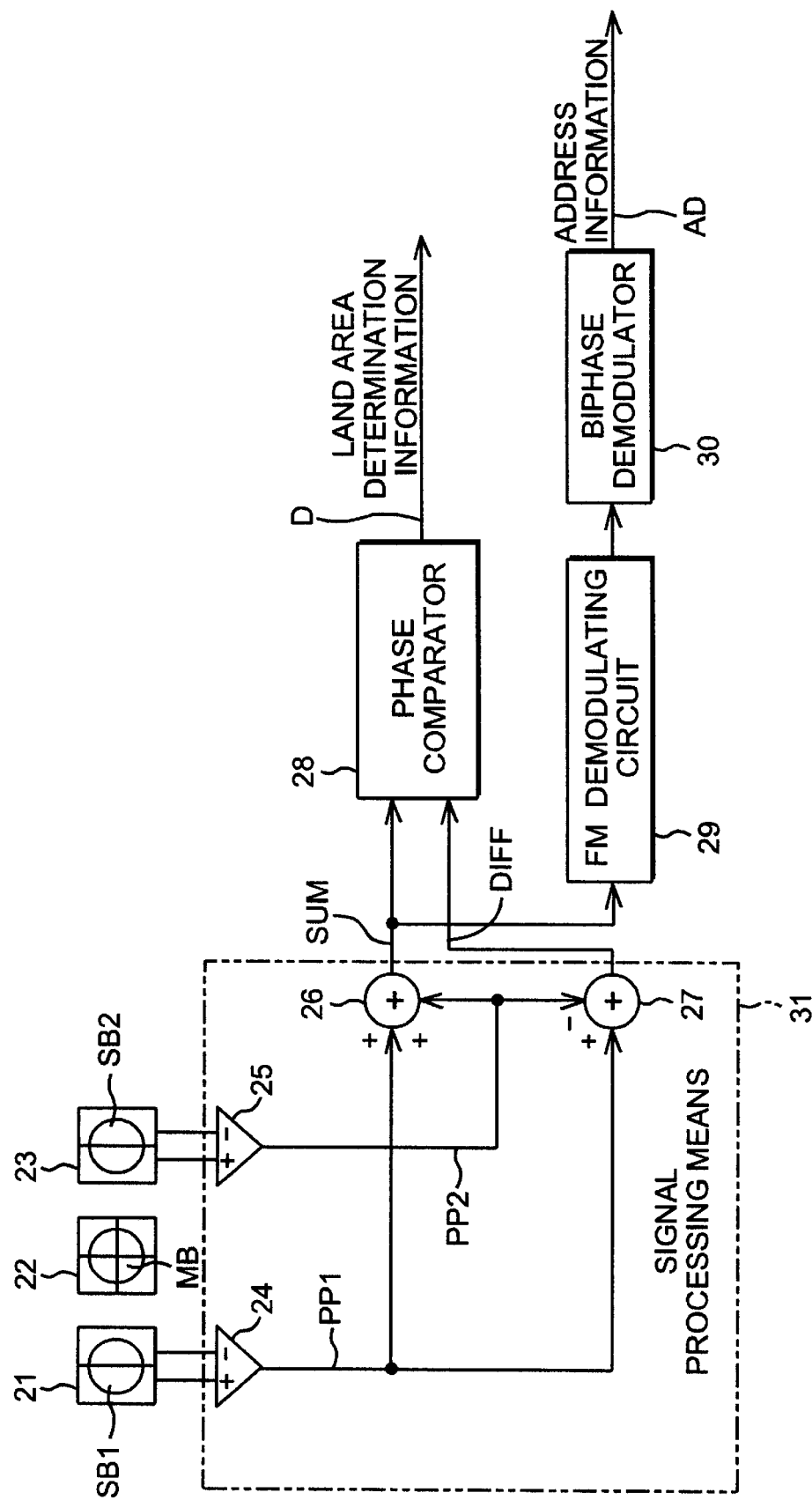
FIG. 1 is a block diagram of an address modulating circuit according to Embodiment 1 of this invention.

A reflected light of a main beam MB impinging on a land area 3 or 4, which is shown in FIG. 4, is incident on the quadrant photo detector 22 shown in FIG. 1 and is used to detect a focus error signal.

The signal processing means 31 is configured by, for example, differential amplifiers 24, 25, an adder 29, and a subtractor 27.

Two detection outputs from the split photo detector 21 are supplied to the differential amplifier 24 to obtain a push-pull signal different output PP1 as a first push-pull signal. Likewise, two detection outputs from the split photo detector 23 are supplied to the differential amplifier 25 to obtain a push-pull signal different output PP2 as a second push-pull signal. The push-pull signals PP1, PP2 are obtained from the reflected lights of the subbeams SB1, SB2, respectively. Since one of the subbeams SB1, SB2 is tracing the wobbling groove 1, one of the push-pull signals PP1, PP2 has its amplitude varied due to wobbling.

The two push-pull signals PP1, PP2 are supplied to the adder 26 and the subtractor 27, respectively. The adder 26 adds the two push-pull signals PP1 and PP2 together to output a sum signal SUM. The subtractor 27 subtracts the push-pull signal PP2 from the push-pull signal PP1 to output a difference signal DIFF.

The phase comparator 28 compares the phases of the sum signal SUM with the phase of the difference signal DIFF, and determines whether they are in same phase or out of phase by 180°.

In FIG. 4, while the main beam MB is tracing the land area 3, the subbeam SB1 traces the non-wobbling groove 2 and the subbeam SB2 traces the wobbling groove 1. At this point, the push-pull signal PP2 has its amplitude varied according to the wobbling groove 1, whereas the push-pull signal PP1 is in a non-signal state and consists only of noise components. Accordingly, the sum signal SUM shown in FIG. 1 is almost equal to the push-pull signal PP2. Likewise, the difference signal DIFF is almost equal to a signal obtained by reversing the push-pull signal PP2. Two signals out of phase by 180° are supplied to the phase comparator 28, which then determines that the phases of these signals are different by 180°.

In FIG. 4, while the main beam MB is tracing the land area 4, the subbeam SB1 traces the wobbling groove 1 and the subbeam SB2 traces the non-wobbling groove 2. At this time, the push-pull signal PP1 has its amplitude varied according to the wobbling groove 1, whereas the push-pull signal PP2 is in a non-signal state and consists only of noise components. Accordingly, the sum signal SUM shown in FIG. 1 is almost equal to the push-pull signal PP1. The difference signal DIFF is also almost equal to the push-pull signal PP1. Two signals in phase are supplied to the phase comparator 28, which then determines that the phases of these signals are the same.

Thus, by determining whether the sum and difference signals SUM and DIFF between the push-pull signals PP1 and PP2 are in phase or out of phase, it can be determined which of the two land regions 3, 4 the main beam MB is tracing. Consequently, the phase comparator 28 outputs land area determination information D indicating which of the two land regions 3, 4 the main beam MB is tracing.

Which of the two land regions 3, 4 the main beam MB is tracing can also be determined even if the inputs to the subtractor 27 are reversed to provide opposite phase determination conditions.

The sum signal SUM, which is an output signal from the adder 26, is also supplied to the FM demodulator 29, as shown in FIG. 1. The FM demodulator 29 demodulates a supplied wobble signal to output a biphase coded address signal.

The biphase demodulator 30 decodes the output signal from the FM demodulator 29 to obtain address information AD.

As described above, by comparing the phases of the sum and difference signals SUM and DIFF between the push-pull signals PP1 and PP2 to determine the mutual phase relationship, which land region the main beam light MB is tracing can be determined immediately after the beam light MB has focused on the land area.

In addition, by inputting the sum signal SUM of the push-pull signals PP1 and PP2 to the demodulating means, the address information AD can be obtained using one set of demodulating means.

Although Embodiment 1 is constructed to obtain the address information AD from the sum signal SUM, similar effects can be obtained even if it is constructed to obtain the address information AD from the difference signal DIFF.

Embodiment 2

Embodiment 2 uses the same optical disc device as in Embodiment 1 except for the address demodulating circuit.

The address demodulating circuit according to Embodiment 2 is composed of the split photo detectors 21, 23, the quadrant photo detector 22, the signal processing means 31, the phase comparator 28, the demodulating means, and a signal selector 32, as shown in FIG. 3. The modulating means is composed of the FM demodulator 29 and the biphase demodulator 30.

This address demodulating circuit includes the signal selector 32 that selects one of the two push-pull signals PP1, PP2 based on the land area determination information D outputted from the phase comparator 28. The push-pull signal selected by the signal selector 32 reasonably contains wobbling information, which is demodulated by the FM demodulator 29 and the biphase demodulator 30 as in Embodiment 1 to obtain the address information AD from the wobbling information.

According to Embodiment 1, the signal processing means 31 demodulates the sum signal SUM obtained by adding the two push-pull signals PP1, PP2 together in order to obtain the address information AD, as shown in FIG. 1. One of the two push-pull signals PP1, PP2 does not contain the wobbling information and is in a non-signal state, but it actually contains noise components. Thus, the sum signal SUM obtained by the adder 26 has its noise level increased by $\sqrt{2}$ times to degrade the S/N ratio and thus the error rate for the reading of the address information (AD), though it does not exceed the corresponding permissible range.

According to Embodiment 2, however, the signal selector 32 selects and demodulates one of the push-pull signals PP1, PP2 that contains wobbling information, based on the land area determination information D output from the phase comparator 28. Consequently, the S/N ratio or the address reading error rate is not degraded as in Embodiment 1, and the address information AD can be demodulated appropriately.

As described above, the address information AD can be obtained using one set of demodulating means, by inputting to the demodulating means, output from the signal selector 32 that selects one of the push-pull signals PP1, PP2 that contains wobbling information, based on the land area determination information D from the phase comparator 28.

As described above, the optical disc device signal processing method of this invention compares the phases of the sum and difference signals between the push-pull signal obtained from the output from the first split photo detector and the second push-pull signal obtained from the output from the second split photo detector in order to determine from the mutual phase relationship which land area is reflecting the main beam light. Thus, it does not make this determination based on the presence of address information after the two push-pull signals have been demodulated using two sets of demodulating means as in the prior art. As a result, this method is not subjected to processing delay time in the demodulating means, and can determine which land region the main beam light is tracing, immediately after the beam light has focused on the land area.

In addition, the optical disc device of this invention comprises the signal processing means for detecting the sum and difference signals between the first push-pull signal obtained from output from the first split photo detector and a second push-pull signal obtained from output from the second split photo detector; and the phase comparator for comparing the phases of the sum and difference signals to determine the mutual phase relationship, and uses the determination output from the phase comparator, as the land area determination information. Thus, this device can implement the optical disc device signal processing method of this invention.

In addition, by demodulating the sum or difference signal from the signal processing means or using the signal selector to select and demodulate one of the two push-pull signals that contains wobbling information, based on the determination output from the phase comparator, this invention eliminates the need to provide two sets of demodulating means as in the prior art and requires only one set of demodulating means. Therefore, this invention can implement an optical disc device using a simple configuration and is very practically effective.

What is claimed is:

1. A method of processing signals for an optical disc device, in which a track format optical disc (5) has two land areas (3, 4) of a double spiral structure on which information is recorded, said land areas being arranged adjacent to each other sandwiching between a wobbling groove (1) on which wobble information is recorded by wobbling, an has non-wobbling grooves (2) arranged outside said land areas, the method comprising the steps of:

detecting a first reflected light obtained by irradiating the land areas;

using a first split photo detector (21) disposed at a first prescribed position to detect a second reflected light obtained by irradiating the wobbling groove (1) or the non-wobbling groove (2) located adjacent to one side of the land area providing the reflected light;

using a second split photo detector (23) disposed at a second prescribed position to detect a third reflected light obtained by irradiating the wobbling (1) groove or the non-wobbling groove (2) located adjacent to the other side of the land area providing the reflected light; and recording or reproducing information on or from the land area while executing tracking control based on the first, second, or third reflected light or on a combination of these lights, wherein phases of a sum signal and a difference signal are compared between a first push-pull signal obtained from an output from the first split photo detector (21) and a second push-pull signal obtained from an output from the second split photo detector (23), in order to determine from the phase relationship obtained between the sum and difference signals which land area (3, 4) is providing said first reflected light.

2. An optical disc device, in which a track format optical disc (5) has two land areas (3, 4) of a double spiral structure on which information is recorded, said land areas being arranged adjacent to each other sandwiching therebetween a wobbling groove (1) on which wobble information is recorded by wobbling, and has non-wobbling grooves (2) arranged outside said land areas, said optical disc device executing:

detecting a first reflected light obtained by irradiating the land area;

using a first split photo detector (21) disposed at a first prescribed position to detect a second reflected light obtained by irradiating the wobbling groove (1) or the non-wobbling groove (2) located adjacent to one side of the land area providing the reflected light;

using a second split photo detector (23) disposed at a second prescribed position to detect a third reflected light obtained by irradiating the wobbling groove (1) or the non-wobbling groove (2) located adjacent to the other side of the land area providing the reflected light; and recording or reproducing information on or from the land area while executing tracking control based on the first, second, or third reflected light or on a combination of these lights, wherein said optical disc device comprises:

signal processing means (31) for detecting a sum signal and a difference signal between a first push-pull signal obtained from an output from the first split photo detector (21) and a second push-pull signal obtained from an output from the second split photo detector (23); and a phase comparator (28) for comparing phases of the sum and the difference signals to determine a mutual phase relationship, in order to use a determination output from the phase comparator as land area determination information.

3. The optical disc device according to claim 2, wherein an output signal from the signal processing means (31) is demodulated to obtain address information.

4. The optical disc device according to claim 2, further comprising a signal selector that selects between the first push-pull signal and the second push-pull signal based on the land area determination information outputted from the phase comparator (28), whereby the push-pull signal selected by the signal selector is demodulated to obtain address information.

* * * * *